July 4, 1950

J. FROSSARD 2,514,232

COLLAPSIBLE MONUMENT MODEL

Filed Dec. 23, 1947

Jesse Frossard
INVENTOR

BY *CA Snow &Co.*
ATTORNEYS.

July 4, 1950 J. FROSSARD 2,514,232
COLLAPSIBLE MONUMENT MODEL
Filed Dec. 23, 1947 2 Sheets-Sheet 2
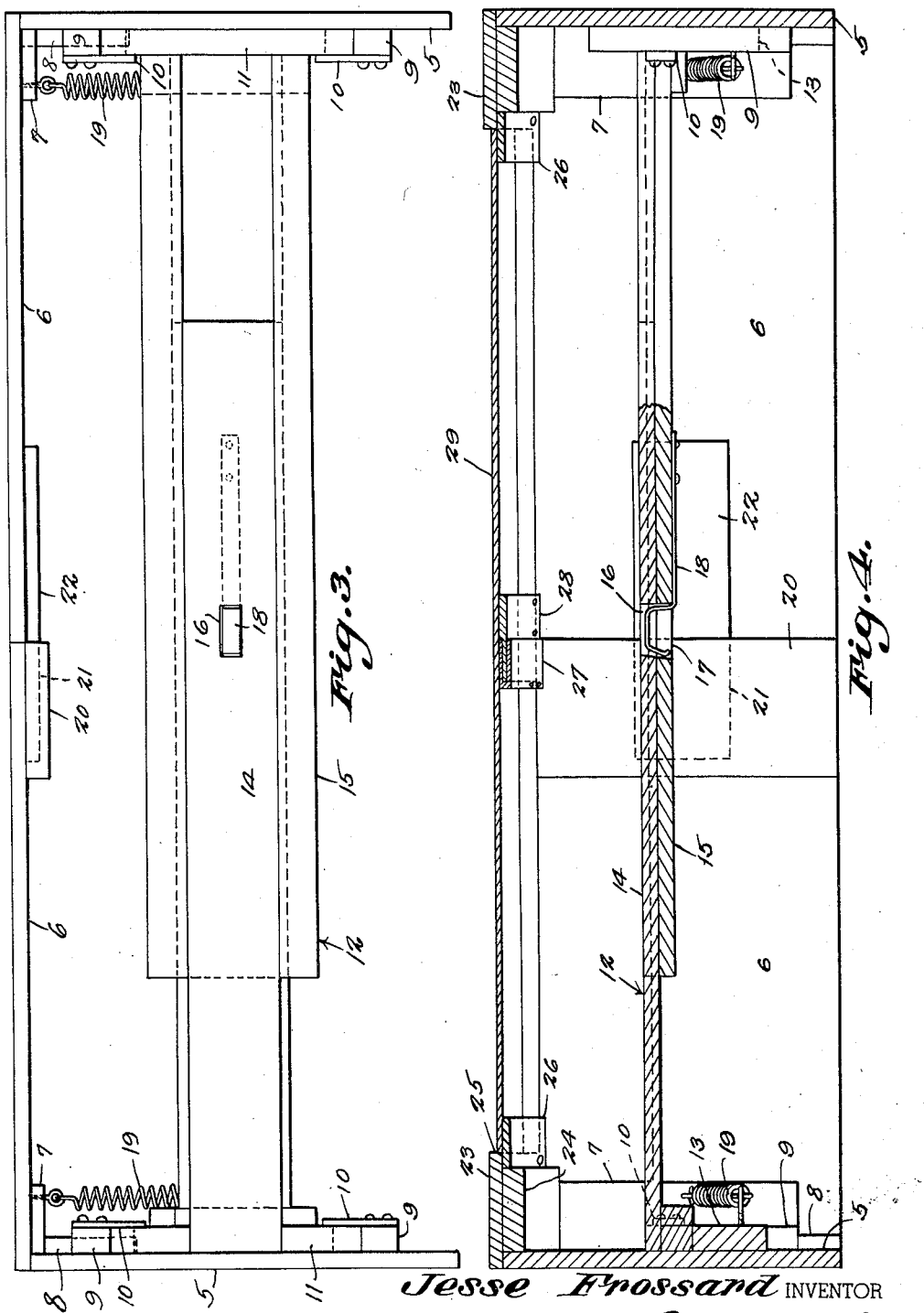
Jesse Frossard INVENTOR
BY CA Snow & Co.
ATTORNEYS.

Patented July 4, 1950

2,514,232

UNITED STATES PATENT OFFICE 2,514,232

COLLAPSIBLE MONUMENT MODEL

Jesse Frossard, Iowa Falls, Iowa

Application December 23, 1947, Serial No. 793,378

4 Claims. (Cl. 35—49)

This invention relates to a collapsible model or display of a grave monument, marker, monolith, or the like.

There is an important need in the art, I have found, for displays or models of grave monuments or markers which can be exhibited to potential purchasers with a view to aiding them in the selection of a suitable monument. Often, completed monuments on hand are not of a type which would interest the purchaser; and it may become rather difficult to arrive at an understanding as to the exact monument desired, even with the use of available photographs or drawings. Sometimes, a monument of special dimensions may be required or similar problems may be presented by the purchaser. In other cases, the potential purchaser may not be satisfied with viewing a drawing or photograph, and may desire to have some idea as to how the monument would actually look. In still other cases, it is necessary to visit the purchaser at his residence or at some other point remote from the place in which actual monuments can be viewed and a selection made.

It is an important object of the invention, therefore, to provide a collapsible monument model, which can be collapsed or folded to approximately one-half the actual size of the model, and in fact, which can be disassembled completely as necessary to be reassembled with other parts for the purpose of showing the various types of monuments and thereby aiding in a selection. Thus, the salesman is enabled if necessary to carry with him, in visiting the purchaser, a large number of collapsed models, and can also carry with him sets of panels of various types and dimensions which can be fitted into the models in substitution of corresponding panels on the model. In this way, the models can be extended and set up readily, to give the purchaser a clear understanding as to how the completed monument will look, and special requests of the purchaser can be worked into a particular model, whereby it can immediately be seen how a monument so formed will appear when completed.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 3 is a top plan view with the top sections removed.

Figure 4 is a longitudinal vertical section through the model, parts remaining in elevation.

Figure 1:
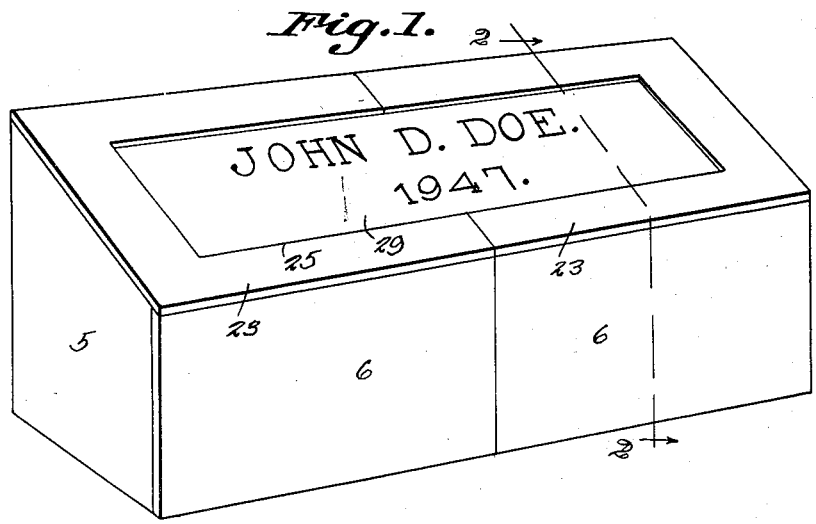
Figure 1 is a perspective view of one form of model, set up for display.

Referring to the drawings in detail, in the illustrated example, the reference numeral 5 designates end panels. These panels, as well as the other panels embodied in the invention, can be of any suitable material, such as wood, plastic, metal, and in fact, marble or slate, to state a few examples. Preferably, the exterior surfaces of the panels are suitably tinted or otherwise prepared to simulate the appearance of a completed monument. At 6 I have designated middle sections, which when fitted together define a front panel for the model. The outer end of each section 6 is provided interiorly with vertical flange strips, these being designated 7 and constituting abutments engaging the front edges of the end panels 5.

Figure 2:
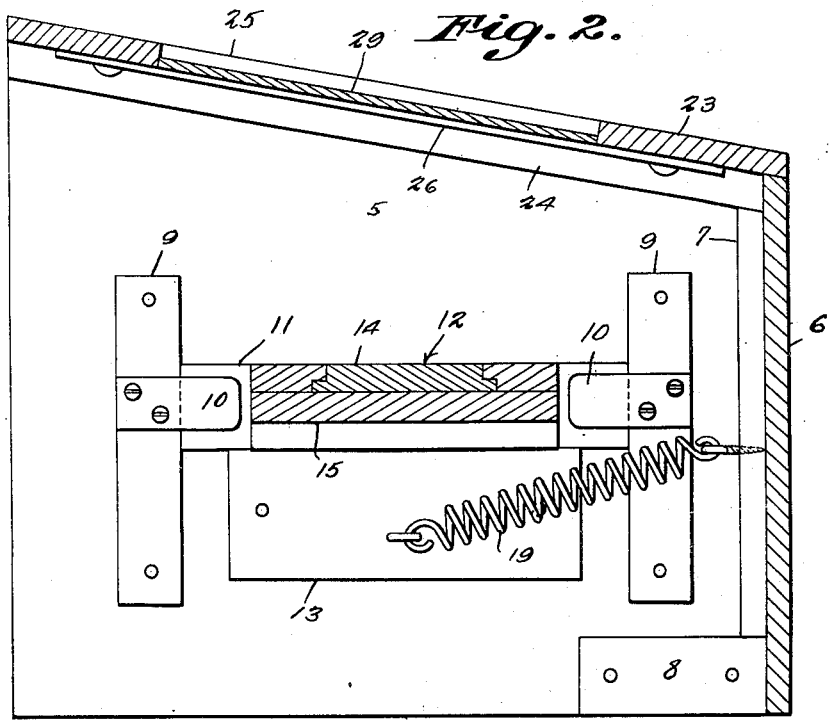
Figure 2 is a transverse section on line 2—2 of Figure 1.

Aligning blocks 8 are fastened to the inner surfaces of the end panels 5, so as to engage the bottom ends of the flange strips 7, as best shown in Figure 2. Thus, the end panels and middle sections can quickly be fitted together, though ordinarily separable, with the combinations of end panels and middle sections being varied as desired, it being understood that a number of sets of panels of various dimensions and sizes can be carried.

Referring further to Figure 2, to the inside of each panel 5 is connected a pair of spaced guide strips 9 to which are secured inwardly extended ears 10. Ears 10 are adapted to retain cross bars 11 secured to the opposite ends of an extensible longitudinal brace, designated generally at 12. This brace can be removed from engagement with the end panels 5 mereby by lifting the cross bars 11 from behind ears 10. The brace can be inserted as easily, and when inserted, the ends of the brace are supported by supporting blocks 13 secured to the end panels 5 between the guide strips 9 thereof.

The longitudinal brace 12 has a telescoping action, this being provided by use of a slide 14 movable longitudinally of a guide 15 that is suitably flanged to prevent buckling.

The purpose of providing a longitudinal brace extensible as described is to permit collapsing of the model, the brace, however, being capable of being extended to a desired length when the model is set up.

With a view to providing means for preventing relative movement of the telescoping parts of the brace after it has been extended to the proper length, I provide an opening 16 for the slide 14, and an opening 17 for the flanged guide 15, which openings are adapted to be brought into register. As soon as they coincide, a leaf spring 18 carried by the guide 15 springs into the openings, and prevents relative movement of the members.

Screw eyes are secured to the flange strips 7 and supporting blocks respectively, as best shown in Figure 2, and these are adapted to receive, detachably, the ends of coil springs 19. When knocking down a model, the springs 19 can be removed, and can be attached in place in setting up a desired combination of panels.

The middle sections 6 are separable, but when the model is set up, they are adapted to interlock. As shown in Figures 3 and 4, a retaining block 20 can be secured to one of the sections, this being formed with an opening 21 adapted to receive tongue 22 extending from the other section. When the model is collapsed, the sections are simply separated, whereupon the longitudinal brace 12 can be collapsed so as to reduce the model to approximately half size with the middle sections lapping each other.

Top sections 23 are also separable. Each of these sections is provided, at its outer end, with transverse guide rails 24 that permit the top sections to be fitted in place removably, upon the connected end panels and middle sections.

When fitted together, the top sections 23 cooperate to provide a framed opening 25 extending substantially from end to end of the model, as shown in Figure 1. End supporting strips 26 extend toward each other from the ends of the opening, as best shown in Figure 4.

For the purpose of readily interlocking the top sections 23, there is provided on one of the sections a transversely disposed slotted strip 27, receiving tongue 28 carried by the other section.

Removably fitted in the opening 25 is a name plate 29, which can be suitably lettered. The purpose of the end supporting strips 26 is to give proper support to the ends of the name plate, and the interlocking members 27 and 28 extending across the center of the opening may also serve to support the center portion of the name plate.

As will be seen, the model illustrated and described can be collapsed to approximately half its size, for ready transportation, and is quickly set up when needed. The illustrated model is, of course, merely an example, since there are a great many types of monuments and markers. Thus, one can carry a number of collapsed models. Additionally, one may carry various sets of end panels, which can be substituted for the end panels of the models, so as to vary the appearance thereof as desired by the potential purchaser. Substitution of end panels, middle sections, or top sections as necessary is easily achieved by detaching those already on a particular model, and a very desirable characteristic of the invention, in this respect, is its capability of being completely knocked down for this purpose and also for the purpose of being reduced to a compact area permitting transportation of an unusually large number of models.

Some of the materials which could be used in fabricating the panels have been previously mentioned herein. Others that might be used are plaster of Paris, paper, cardboard, composition, cloth, rubber, glass, Celluloid, and granite.

What is claimed is:

1. A collapsible monument model including end panels, a collapsible brace having its opposite ends detachably connected to the center portions of the panels and constituting with the panels a rigid frame, separable middle sections abutting against the end panels, springs extending between the middle sections and end panels for holding said sections and panels assembled, and separable top sections removably supported by the middle and end panels.

2. A monument model including end panels, a collapsible brace having its opposite ends detachably connected to the center portions of the end panels and constituting with the panels a rigid frame, collapsible middle sections having their inner ends abutting against each other and their outer ends abutting against the end panels, springs extending between the middle sections and end panels for holding said sections and panels assembled, and top sections removably carried by the middle sections and end panels, the top sections cooperating to provide an opening, and a name plate removably covering the opening.

3. A monument model including a pair of upstanding end panels, a collapsible longitudinal brace having its opposite ends detachably connected to the centers of said panels, a collapsible middle panel comprising separable middle sections abutting along their inner edges and having their outer edges abutting against the end panels, springs having their ends separably attached to the end panels and middle sections respectively for holding said sections and panels assembled, and a top panel detachably assembled with said end panels.

4. A monument model including end panels, a longitudinal brace extending therebetween, said brace including relatively slidable members and means for preventing the relative movement thereof in a predetermined relationship, seats on the inner surfaces of the end panels, the ends of the brace being removably supported within the seats and said brace and seats providing a rigid frame, middle sections separably interlocked with each other medially between the end panels, the ends of the middle sections abutting against the respective end panels, springs separably connected to the middle sections and end panels for holding said sections and panels assembled, top sections supported by the middle sections and end panels, and means detachably interlocking the top sections.

JESSE FROSSARD.

REFERENCES CITED

The following references are of record in the file of this patent:

UNITED STATES PATENTS

| Number | Name | Date |
| --- | --- | --- |
| 796,738 | Le Cuyer | Aug. 8, 1905 |
| 1,098,132 | Spitz | May 26, 1914 |
| 1,195,908 | Cochrane | Aug. 22, 1916 |